Aug. 6, 1929. J. G. BLUNT 1,723,498
LOCOMOTIVE DRIVING BOX
Filed May 3, 1926
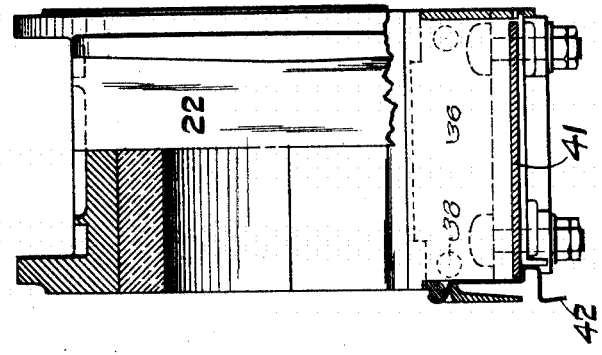
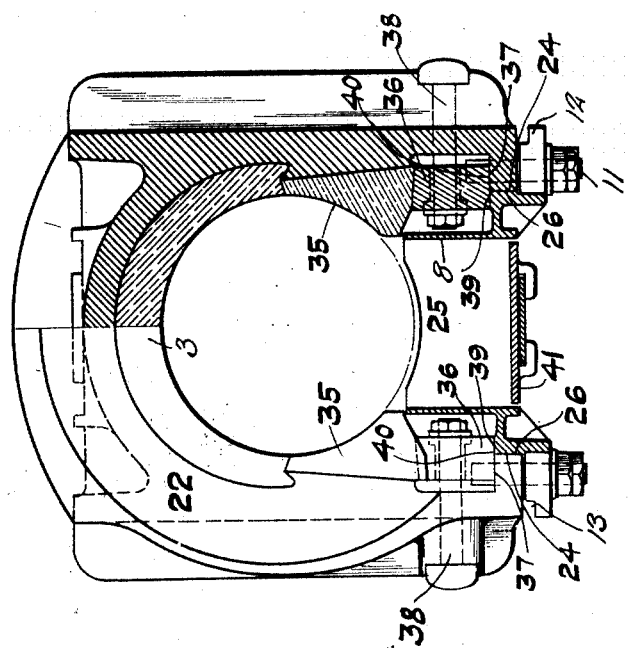
INVENTOR
James G. Blunt
BY
Clarence D. Kerr
ATTORNEY Patented Aug. 6, 1929.

1,723,498

UNITED STATES PATENT OFFICE.

JAMES G. BLUNT, OF SCHENECTADY, NEW YORK.

LOCOMOTIVE DRIVING BOX.

Application filed May 3, 1926. Serial No. 106,213.

My invention relates to the lubricant containing cellars of axle boxes wherein a body of solid lubricant is held against the axle journal, and has for its object an improvement in structure whereby the cellar itself is of such rugged construction that it forms an effective spreading means at the bottom of the box to oppose its tendency to crush the cellar, as it tends to close in when heated. A still further object is to utilize the cellar as an auxiliary support for supplemental bearings when such bearings are used.

It is well known in the art that the axle boxes which span the journals have apertures in their under sides just sufficiently wider than the diameter of the journal to permit a box to be lowered upon the journal, and that afterward this aperture is closed by the cellar carrying the lubricant. Considering the cellar merely as a carrier for the lubricant supply, it has been the practice in the past to construct it as lightly as possible, with the result that it has been found that the inherent tendency of the box to close in at the bottom when heated, pinches the cellar, to the extent that the cellar is frequently destroyed while being removed from the box. In the effort to overcome these difficulties various expedients have been employed, such as an entirely separate spreader, or a wedging mechanism to cooperate with the cellar.

In carrying out my invention, the cellar only is used for this spreading means, and the rugged construction employed produces a cheap and efficient structure which has a long life, is easy to manipulate, and is capable of meeting all service demands, as well as many removals and replacements.

Cellars made for using solid lubricant, or grease cakes, as they are called, are usually made of a width to completely close the aperture in the bottom of the axle box. In such cases the grease cakes have a width only slightly less than the diameter of the journal, but with the employment of boxes having supplemental bearings located below the horizontal axis, the remaining space, after the insertion of the supplemental bearings, is narrowed, and a grease cake considerably under the diameter of the journal must be used. Practice has shown that this narrower grease cake is just as efficient a lubricator as the cake of full width formerly used, and it is a feature of this invention to adapt this narrow grease cake to all forms of axle boxes by a suitable construction of cellar. A resulting advantage is that grease cakes of uniform width can be used on a set of axle boxes regardless of whether or not the boxes are equipped with supplemental bearings.

The cellar construction herein described readily lends itself to form additional supports for the supplemental bearings, the support in question being afforded at points in which the box provides no direct support, since it is there cut away to pass over the journal, and consequently support from the cellar is most effective because it is nearer the inner edges of the supplemental bearings.

The improvement claimed is hereinafter fully set forth:

In the accompanying drawings: Figure 1 is a front view, half in vertical transverse section, and half in elevation, of a driving box embodying my invention and Fig. 2, a side view, half in central longitudinal vertical section and half in elevation, of the construction shown in Fig. 1.

In the practice of my invention, referring descriptively to the specific embodiment thereof which is herein exemplified, the driving box 22 has the usual crown brass 3 having also the aperture in its under side between the faces 24 just slightly wider than the diameter of the bearing, to permit the box to be lowered into position on the journal.

The cellar 25 is slidably inserted from below, and has vertical faces 26 which form a tight fit against corresponding vertical surfaces 24 on the box. The bottom 41 of the cellar is located in the same horizontal plane as the lower extremity of the box cooperating with the surfaces 26, and forms an effective strut at the bottom of the box to resist any tendency of the sides of the box to come together at this point. The space between the cellar side walls 8 contains the grease cake, which is pressed upwardly against the under side of the journal by the usual springs (not shown), and it will be noted that the distance between cellar side walls 8 is considerably narrower than the diameter of the axle, thereby permitting the use of a narrower grease cake than usual.

The cellar 25 is drawn vertically into position by bolts 11, the T-heads of which bear on the box and the lower ends of which extend through lugs 12 formed on the cellar 25. For purposes of easy removal, recesses 13 are formed in the top outside edges of the lugs 12 for insertion of the point of a pry.

Supplemental bearings, 35, are employed in conjunction with the brass, 3. These bearings 35 are held in place by wedge bars 36, supported on shoulders 37 on the side walls of the box 22 and attached thereto by the bolts 38.

Without the use of a cellar of the character just described, the supplemental bearings 35 would be supported only from the wedge bars 36 resting on the shoulders 37 of the box, but as the distance between the inner side faces of the box is greater than the diameter of the journal, no vertical support would be afforded in this zone.

When, however, a cellar is used as herein described, valuable additional support in a vertical direction is obtained by the faces 39 on the cellar 25 which bear upwardly on the bottom faces 40 of the wedge bars 36. It will thus be seen that the entire areas of the faces 39 form additional supports for the wedge bars 36 and supplemental bearings 35; the cellar 25 has a removable drop bottom 41 latched in position by means of a spring 42.

I claim as my invention and desire to secure by Letters Patent:

1. The combination of a locomotive driving box, having side walls, each formed at its bottom with a horizontal, inwardly directed flange for partially supporting a supplemental bearing wedge bar; a lubricant cellar, comprising a strut adapted to prevent the side walls of the driving box from closing in, and providing bearing faces for partially supporting the supplemental bearing wedge bars; a crown brass; supplemental bearings 35 fitted in the side walls of the driving box, and supporting the crown brass, and a wedge bar supported partially on the flange of one of the side walls of the driving box, and partially on the strut, for supporting each of the supplemental bearings.

2. In a locomotive driving box, the combination of detachable supplemental bearings; flanges projecting inwardly from the sides of the box, having upper supporting faces beneath the bearings; wedges interposed between said supporting faces and said supplemental bearings; and a cellar for lubricant, having faces beneath the wedges for further supporting the bearings.

3. In a locomotive driving box, the combination of detachable supplemental bearings; flanges projecting inwardly from the sides of the box, having upper supporting faces beneath the bearings, and inner vertical faces; wedges interposed between said supporting faces and the supplemental bearings; and a cellar for lubricant, having faces beneath the wedges for further supporting same, and faces coacting with the vertical faces for supporting the sides against inward displacement.

JAMES G. BLUNT.